UNITED STATES PATENT OFFICE.

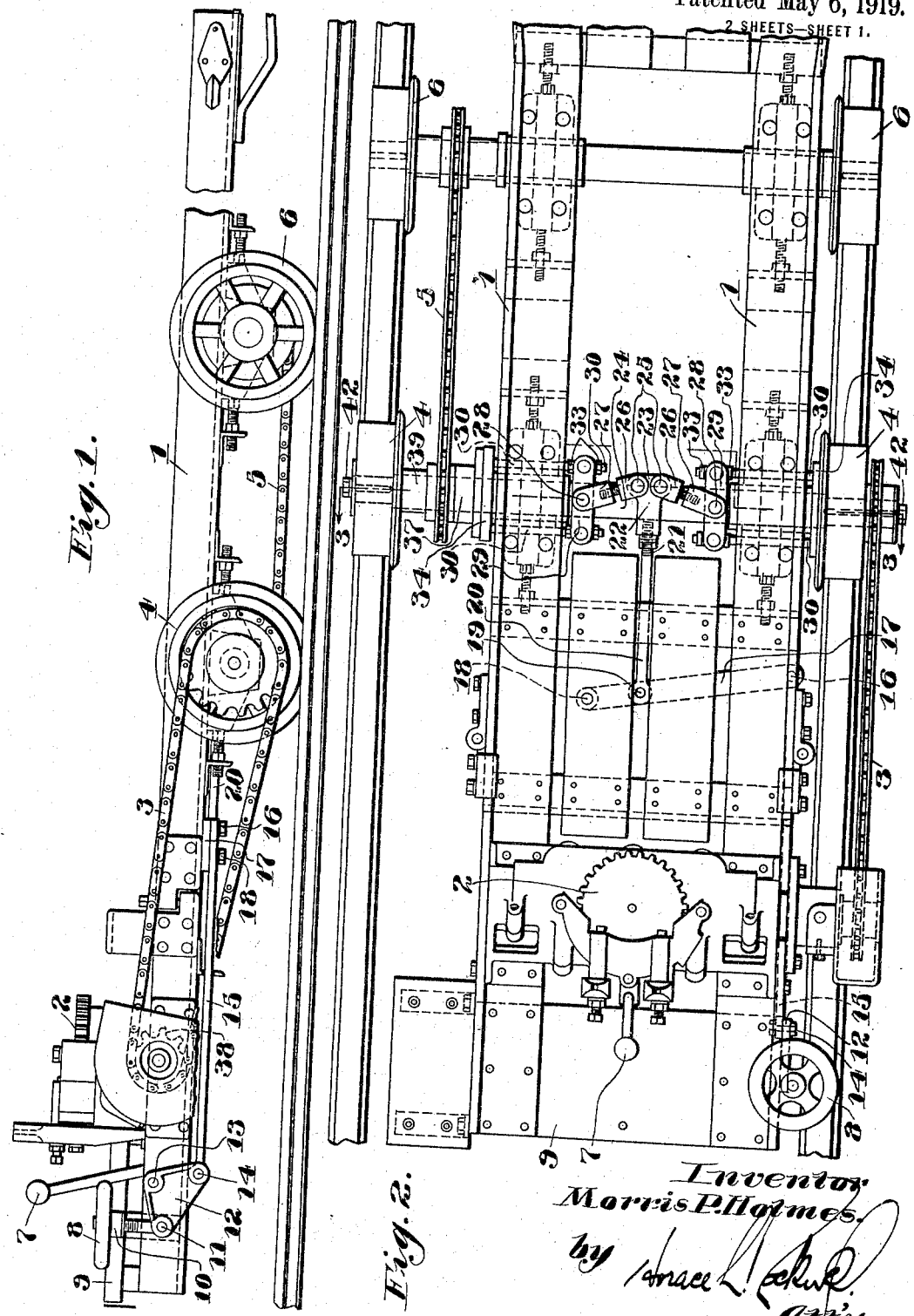

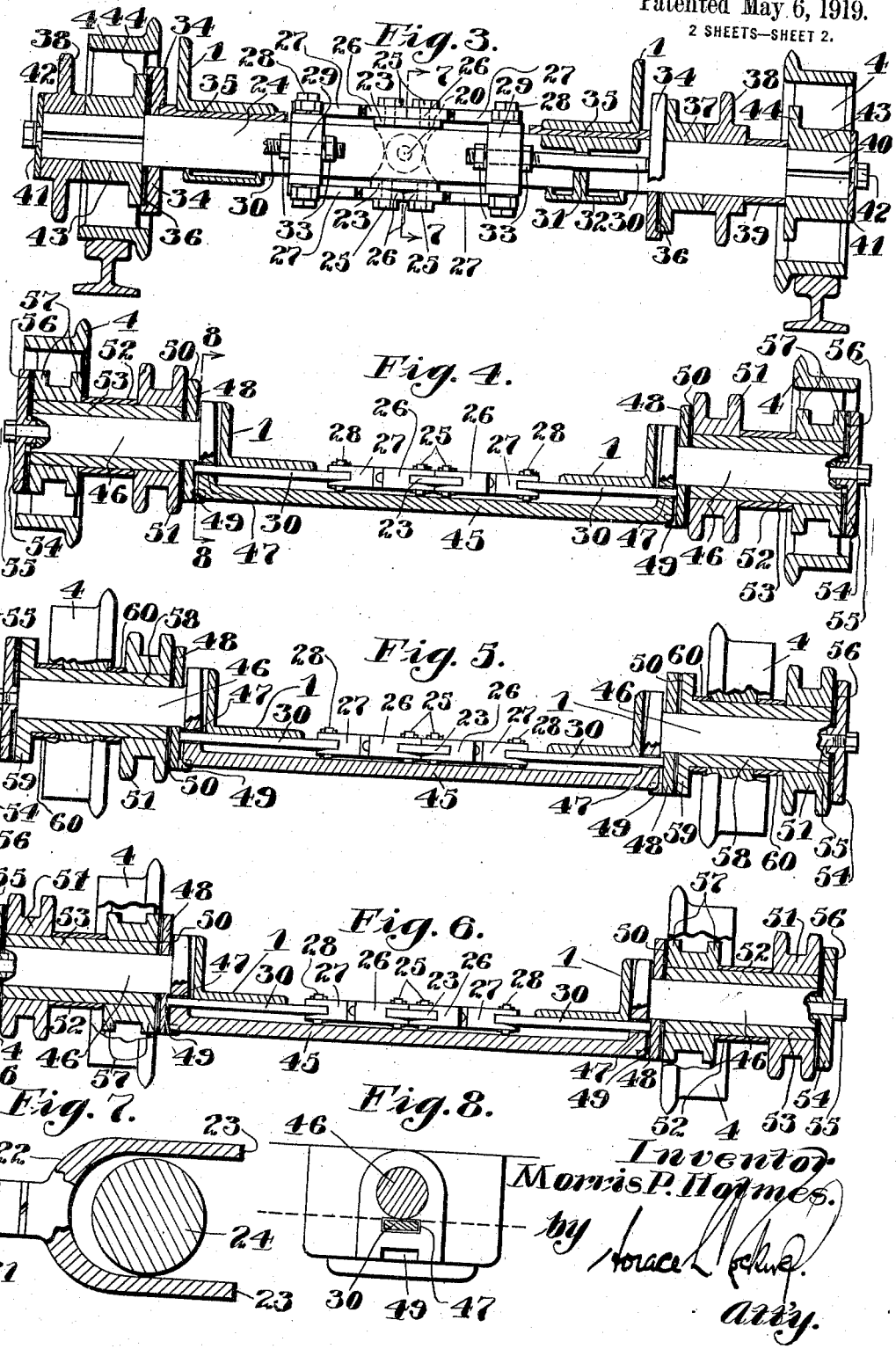

MORRIS P. HOLMES, OF CLAREMONT, NEW HAMPSHIRE, ASSIGNOR TO SULLIVAN MACHINERY COMPANY, A CORPORATION OF MASSACHUSETTS.

BRAKING MECHANISM.

1,303,219.  Specification of Letters Patent.  Patented May 6, 1919.

Application filed October 17, 1917.  Serial No. 197,083.

*To all whom it may concern:*

Be it known that I, MORRIS P. HOLMES, a citizen of the United States, residing at Claremont, in the county of Sullivan and State of New Hampshire, have invented certain new and useful Improvements in Braking Mechanism, of which the following is a full, clear, and exact specification.

My invention relates to braking mechanism.

It has for its object to provide an improved braking mechanism especially adapted to use in connection with trucks or the like, whereby the movement of the truck may be controlled and arrested almost instantaneously if desired. A more specific object of my invention is to provide an improved braking mechanism especially adapted to emergency use in connection with mining machine trucks and provided with improved means whereby the truck, even although loaded with a heavy mining machine and operating upon a grade, may be brought to rest almost instantaneously with a minimum of effort on the part of the operator. These and other objects and advantages of my improved construction will, however, hereinafter more fully appear.

In the accompanying drawings, I have shown for purposes of illustration two embodiments which my invention may assume in practice, illustrating the same as applied to a plurality of mining machine trucks of standard construction.

In these drawings,—

Figure 1 is a side elevation of a straight axle mining machine truck equipped with my improvement.

Fig. 2 is a plan view of the same truck.

Fig. 3 is a transverse sectional view taken on line 3—3 of Fig. 2.

Fig. 4 is a view similar to Fig. 3 showing my invention applied to a drop axle truck.

Fig. 5 is a view similar to Fig. 4 showing my invention applied to the same device when the track gage has been decreased.

Fig. 6 is a view similar to Fig. 4 showing the mechanism applied to a truck of still narrower track gage.

Fig. 7 is a sectional view taken on line 7—7 of Fig. 3.

Fig. 8 is a sectional view taken on line 8—8 of Fig. 4.

In this illustrative construction, I have shown a truck comprising a truck frame 1 adapted to receive a mining machine in a well known manner and to be driven from a moving part of the mining machine through a driving gear 2 carried at the rear of the truck and operatively connected, through suitable truck driving mechanism including a chain and sprocket connection 3, to the rear truck wheels 4, which are in turn operatively connected through a chain and sprocket connection 5 to the front truck wheels 6. As in a well known construction, this truck driving mechanism is normally controlled through suitable brake and clutch mechanism not illustrated in detail, and in turn controlled by a single controlling lever 7.

In my improvement, it will be noted that a supplemental braking mechanism is provided especially adapted to use in emergencies, as when the usual brake and clutch becomes inoperative or insufficient, for any reason. As shown, this supplemental braking mechanism is disposed within the frame and is operatively connected to the rear truck wheels 4 and controlled by a suitable controlling member, herein illustrated in the form of a hand wheel 8. This wheel is preferably located, as shown, at the rear of the truck adjacent the controlling lever 7 and at one side of a suitable rear platform 9 on which the operator may ride and at the same time have ready access to each of the controlling members 7 and 8. This controlling wheel 8, as shown, is threaded in a suitable nut 10 on the platform and pivotally connected at its lower end at 11 to a triangular shaped plate 12 pivoted at 13 on the frame and pivotally connected at 14 to a longitudinally disposed link 15 disposed inside the chain connection 3 and extending to a point substantially midway between the gear 2 and the axle of the rear wheels 4. At its front end this link 15 is pivotally connected at 16 to a transversely disposed member or arm 17 preferably pivoted at 18 on the opposite side of the center line of the truck. As shown, this arm is itself pivotally connected at 19 at a point intermediate its ends and preferably nearer its pivot to a second longitudinally disposed member 20 preferably adjustably threaded at 21 into a U-shaped toggle operating member 22 having arms 23 extending above and below the rear axle member 24. As illustrated, these arms 23 are each pivoted at 25 to oppositely extending toggle links 26 adjustably threaded into coöperating link members 27, in turn pivoted at 28 to reciprocable members 29. As shown, these members 29 are each provided with a plurality of laterally extending pins 30 disposed on opposite sides of the axle and movable through suitable apertures 31 in castings 32 fixed to the under side of the truck frame members 1, the pins being suitably fixed in position by lock nuts 33 preferably disposed on opposite sides of the members 29. The pins 30 in each set, as shown, engage the opposite sides of disk-like members 34 carried on the axle 24 and locked against rotation with respect thereto and to suitable axle bushing members 35, which are in turn locked against rotation with respect to the members 1. As illustrated, these members 34 are reciprocable longitudinally of the shaft under pressure of the pins 30 and are provided with outer friction surfaces 36 disposed between the same and a suitable abutment likewise slidable on the shaft. As shown at the right in Fig. 3, one of these abutments is in the form of a spacing sleeve 37, flanged to provide a larger friction surface, and in turn abutting against a drive sprocket 38 spaced from the wheel 4 by means of a suitable pipe washer 39. It will also be noted that the wheel is held in position upon a reduced end 40 of the axle 24 by means of a suitable plate or washer 41 clamped in position by an axially disposed bolt 42. In the construction illustrated at the left of Fig. 3, it will be observed that instead of providing a sprocket 38 between the member 34 and the wheel, a sprocket 38 is provided outside the wheel, and that the friction surface 36 is provided between the member 34 and the hub of the wheel 4, which in turn abuts against the sprocket 38. As in the construction shown at the right hand side of the figure, it will also be noted that a suitable plate or washer 41 is provided over the end of the shaft, and held in place by an axial bolt 42. In order to facilitate manufacture, it will also be noted that the hub 43 of each of the wheels 4 is provided with a flange 44 which, while not used when the wheel is placed at the right, as shown in Fig. 3, is of service when the wheel is placed at the left, as shown in that figure, the flange then coöperating with the member 34 in order to provide a larger bearing surface.

The means herein described for adjusting the gage of the truck is substantially the same as that described and claimed in my copending application Ser. No. 197,085, filed Oct. 17, 1917.

In the form of my invention shown in Figs. 4, 5, 6, and 8, the same is illustrated as applied to a drop axle adapted to use in low mines. In this construction, it will be noted that instead of providing a straight live axle member, a so-called drop and stationary axle member is provided, the same preferably assuming the form of an axle casting 45 having axle stubs 46 formed thereon. In this construction, substantially the same toggle mechanism is used to operate the pins 30, but it will be noted that single pins are used and that these pins are extended through suitable apertures 47 in the casting 45, preferably located at a point below the axle stubs 46, and that these pins engage disk-like members 48, locked against rotation with respect to the casting 45 by any suitable interlocking means, as indicated at 49, and having friction surfaces 50 on their opposite sides. In the form shown in Fig. 4, wherein the same is illustrated as applied to a wide gage truck, these friction surfaces are adapted to engage with the sides of suitable driving sprockets 51 which are in turn spaced apart from the wheels 4 by means of relatively wide pipe washers 52. The sprockets also serve as spacing members and may be interchangeable with other elements to vary the gage. It will also be observed that in this construction a sleeve 53 is placed upon each of the axle stubs 46 to carry the members 51 and 52 and the wheel 4, and that one end of this member likewise engages the friction surfaces 50. The members 4 and 51 are preferably connected to the sleeve as by keys and a keyway so that the elements mounted on the sleeve rotate as a unit and so that any braking action applied to one of the elements is transmitted to the wheel. It will also be noted that a plate 54 is suitably fixed to the end of the stationary axle stub 46 by means of a bolt 55, and that a friction surface 56 is provided between this plate and the adjacent surfaces of the wheel hub and sleeve 53 and that the wheel hubs in this instance are provided with a plurality of flanges 57 to give a larger friction surface. In the construction shown in Fig. 5, it will also be noted that my invention is illustrated as applied to a construction substantially similar to that shown in Fig. 4, although in this instance it will be observed that by the substitution for the sleeve 53 of a sleeve 58 having a flange 59, and the substitution of two small washers 60 for the large spacing washer 52, together with the shifting of various elements and the reverse use of the sleeve, it has been possible to adapt my improved device to a truck of narrower track gage, the flange 59 being disposed adjacent the member 48, the wheel 4 being disposed between the washers 60, and the sprocket 51 being disposed between the right hand washer 60 and the friction surface 56. In the construction shown in Fig. 6, it will also be noted that the same construction shown in Fig. 4 is illustrated as applied to a truck of still different track gage, in this instance an even narrower track gage than that shown in Fig. 5, the wheel 4 being placed with its hub immediately adjacent the member 48, while the sprocket 51 is placed immediately adjacent the friction surface 56, and the spacing washer 52 is placed between these two elements. Obviously, in each of these constructions my improved braking mechanism may be used with equal facility, and in each of the same a greatly increased friction area is obtainable due to the provision of the plurality of friction surfaces.

In the use of my improved construction, it will be observed that through the provision of the toggle and the lever mechanism for operating the same, it is possible for an operator to exert an exceedingly powerful pressure upon the pins 30 in such a manner as to cause those pins to move the members coöperating therewith out against their frictional surfaces and thereby act effectively to retard or arrest the rotation of the wheels. In fact, it has been developed that through the use of my improved mechanism it is possible for the operator with only a relatively easy movement of the controlling member 8 to exert a pressure of four thousand pounds upon the friction surfaces and thus, despite the weight of the heavy mining machine and the truck, and despite any grade upon which the latter may be traveling, bring the truck to rest within a relatively few feet. It will also be noted that in the use of my improved construction it is entirely unnecessary to provide any brake rigging which would in any way interfere with the connection of the truck driving mechanism to the wheels, or with the normal operation of the truck driving mechanism. Attention is also directed to the fact that my improved mechanism may be readily adapted to either hand or power operation, and that while it is of an exceedingly rugged type and adapted to withstand hard usage and to be adjusted to take up wear, it may be very readily manufactured at small expense. These and other advantages of my improvement will, however, be clearly apparent to those skilled in the art.

While I have in this application specifically described two embodiments which my invention may assume in practice, it will be understood that these forms of the same are used for purposes of illustration, and that my invention is in no wise limited to these constructions, the same being capable of assuming various other forms and it being my intention to include all such forms within the scope of the appended claims.

What I claim as new and desire to secure by Letters Patent is:

1. In a truck, a truck frame, an axle member thereon, an adjustable gage unit including a wheel element and a spacing element, a wheel driving element, and braking means adapted to engage certain of said elements for retarding the movement of the wheel element.

2. In a truck, a truck frame, an axle member thereon, an adjustable gage means including a wheel element and means for holding said wheel in adjusted position on said axle, and means including a non-rotating member adapted to engage said adjustable gage means to retard the movement of the wheel element.

3. In a truck, a truck frame, an axle member thereon, an adjustable gage unit including a sleeve element and a wheel element adjustably mounted thereon, and means carried by said truck and adapted to engage said unit to retard the movement of the wheel element.

4. In a truck, a truck frame, an axle member thereon, an adjustable gage unit including a sleeve element and a wheel element adjustably mounted thereon, and a non-rotating member carried by said truck and adapted to engage said unit to retard the movement of the wheel element.

5. In a truck, a truck frame, an axle member thereon, an adjustable gage unit including a sleeve element and a wheel element adjustably mounted thereon, and a non-rotating member carried by said truck and movable longitudinally of said axle member and adapted to engage said unit to retard the movement of the wheel element.

6. In a truck, a truck frame, an axle member thereon, an adjustable gage means including a wheel element and means for holding said wheel in adjusted position on said axle, and a non-rotating member movable longitudinally of said axle member and adapted to engage said adjustable gage means to retard the movement of the wheel element.

7. In a truck, an axle member, an adjustable gage unit including a sleeve element, a wheel element carried thereby and a spacing element, a non-rotative member mounted on said axle, and means for engaging said member and unit for retarding the wheel element.

8. In a truck, an axle member, an adjustable gage unit including a sleeve element, a wheel element carried thereby and a spacing element, a non-rotative member mounted on said axle, and means for engaging said member and one of said elements for retarding the wheel element.

9. In an adjustable gage truck, the combination including an axle member, a plurality of wheel units thereon, frictional braking means for said units, operating means therefor movable longitudinally of said axle member, and means whereby the gage of said wheels may be varied without disturbing said braking means.

10. In a truck, an axle member, an adjustable gage unit including a sleeve element, a wheel element carried thereby and a spacing element, a plurality of non-rotative members mounted on said axle, and means for engaging said members and unit for retarding the wheel element.

11. In a truck, an axle member, an adjustable gage unit including a sleeve element, a wheel element carried thereby and a spacing element, a plurality of non-rotative members mounted on said axle, and means for engaging said members and certain of said elements for retarding the wheel element.

12. In a truck, a truck frame, an axle member thereon, an adjustable gage unit including a wheel element and a spacing element, and braking means including friction members and a plurality of pins engageable with said friction members adapted to engage certain of said elements for retarding the movement of the wheel element.

13. In a truck, a truck frame, an axle member thereon, an adjustable gage unit including a wheel element and a spacing element, braking means including friction members and a plurality of pins engageable with said friction members adapted to engage certain of said elements for retarding the movement of the wheel element, and toggle mechanism carried by said truck for operating said pins.

14. In a braking mechanism, an axle member, a plurality of wheels therefor, friction members locked against rotation with respect to said axle member and movable longitudinally thereof, means including a plurality of reciprocable pins on opposite sides of said axle member, links pivotally connected to the inner ends of said pins, and a longitudinally reciprocable operating member having arms disposed on opposite sides of said axle member and operatively connected to the adjacent ends of said links.

15. In combination, a truck frame, an axle member thereon, wheels on said axle member, braking mechanism movable longitudinally of said axle member and coöperating with each of said wheels, toggle mechanism for operating said braking mechanism disposed beneath said truck frame and between the ends of said axle member, and means for operating said toggle mechanism including a hand wheel and an operatively connected bell crank disposed at the rear end of said truck frame and operative connections between said bell crank and said toggle mechanism including a plurality of longitudinally disposed reciprocable members and an intermediate pivoted member pivotally connected to each of said members.

16. In combination, a truck frame, an axle member thereon, wheels on said axle member, braking mechanism movable longitudinally of said axle member and coöperating with each of said wheels, toggle mechanism for operating said braking mechanism disposed beneath said truck frame and between the ends of said axle member, and means for operating said toggle mechanism including a hand wheel and an operatively connected bell crank disposed at the rear end of said truck frame and operative connections between said bell crank and said toggle mechanism including a plurality of longitudinally disposed reciprocable members and a transversely disposed pivoted member pivotally connected to each of said members on the same side of its pivot.

17. In combination, a truck, an axle member thereon, a wheel on said member, a spacing member on said member, said wheel and spacing member being interchangeable to vary the truck gage, and braking means engageable with either said wheel or said spacing member.

18. In combination, a truck, an axle member thereon, a wheel on said member, a wheel driving means on said member, said wheel and wheel driving means being interchangeable to vary the truck gage, and braking means engageable with either said wheel or said wheel driving means.

In testimony whereof I affix my signature.

MORRIS P. HOLMES.